() United States Patent  
Becker et al.

(10) Patent No.: US 7,752,025 B2  
(45) Date of Patent: Jul. 6, 2010

(54) PARAMETER IDENTIFICATION FOR FIELD DEVICES USED IN AUTOMATION TECHNOLOGY

(75) Inventors: Norbert Becker, Erlangen (DE); Clemens Dinges, Obermichelbach (DE); Joachim Feld, Nürnberg (DE); Christiane Gast, Nürnberg (DE); Bernd Opgenoorth, Nürnberg (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 670 days.

(21) Appl. No.: 11/660,008

(22) PCT Filed: Aug. 9, 2005

(86) PCT No.: PCT/EP2005/053920

§ 371 (c)(1),  
(2), (4) Date: Feb. 8, 2007

(87) PCT Pub. No.: WO2006/018410

PCT Pub. Date: Feb. 23, 2006

(65) Prior Publication Data

US 2007/0255520 A1    Nov. 1, 2007

(30) Foreign Application Priority Data

Aug. 19, 2004    (DE)    ........................ 10 2004 040 282

(51) Int. Cl.  
*G06F 17/50*    (2006.01)

(52) U.S. Cl. ...................................................... 703/13

(58) Field of Classification Search .................... 703/13; 702/127

See application file for complete search history.

(56) References Cited

U.S. PATENT DOCUMENTS 4,761,748 A    8/1988    Le Rat et al.  
5,448,147 A    9/1995    Kasai (Continued)

FOREIGN PATENT DOCUMENTS

DE    698 14 103 T2    6/2000

(Continued)

OTHER PUBLICATIONS

Electronic Device Description Language (EDDL), "Uniform Field-Bus-Spreading Speaking and Pool of Broadcasting Corporations for Technical Manual", Apr. 19, 2004, pp. 1-2, p. 1-Pressmeeting, http://www.profibus.com.

(Continued)

*Primary Examiner*—Paul L Rodriguez  
*Assistant Examiner*—Luke Osborne

(57) ABSTRACT

A device and a method for identifying parameters of at least one field device used in automation technology are provided. To simplify the assignment of parameters to field devices in automated systems, the behavior of the field device is monitored and operating information that describes the field device behavior is recorded. The operating information is stored in a first memory area, a manufacturer-independent field device model is stored in a second memory area and model parameters belonging to the manufacturer-independent field device model are identified on the basis of the operating information with the aid of a processing unit.

15 Claims, 3 Drawing Sheets

U.S. PATENT DOCUMENTS

| | | | |
|---|---|---|---|
| 5,980,078 | A | 11/1999 | Krivoshein et al. |
| 6,088,665 | A | 7/2000 | Burns et al. |
| 6,285,966 | B1 * | 9/2001 | Brown et al. ............. 702/188 |
| 2003/0158709 | A1 | 8/2003 | Ishida et al. |
| 2003/0216879 | A1 | 11/2003 | Hashemian |

FOREIGN PATENT DOCUMENTS

| | | |
|---|---|---|
| DE | 101 42 378 A1 | 4/2003 |
| JP | 06342303 A | 12/1994 |
| WO | WO 00/77585 A1 | 12/2000 |

OTHER PUBLICATIONS

Jani Toro, Jari Karppinen, Jorma Hintikka, Lauri Pohjanheimo, "Automatic Configuration and Diagnostics for Fieldbus Based Automation", Factory Communication Systems, 4$^{th}$ IEEE International Workshop, Västerås, Sweden, Aug. 28-30, 2002, pp. 143-148, XP 10623303.

* cited by examiner

PARAMETER IDENTIFICATION FOR FIELD DEVICES USED IN AUTOMATION TECHNOLOGY

CROSS REFERENCE TO RELATED APPLICATIONS

This application is the US National Stage of International Application No. PCT/EP2005/053920, filed Aug. 9, 2005 and claims the benefit thereof. The International Application claims the benefits of German application No. 10 2004 040 282.5 DE filed Aug. 19, 2004, both of the applications are incorporated by reference herein in their entirety.

FIELD OF INVENTION

The invention relates to an apparatus and a method for identifying parameters of a field device used in automation technology.

BACKGROUND OF INVENTION

Systems employed in automation technology consist of a multiplicity of field devices such as, for example, sensors, controllers, filters, and drives. Should one of said field devices fail, a replacement device has to be used that operates with respect to the production process running on the system with the same operational characteristics as the original device. To insure that the new field device will display an appropriate operational behavior in the production process, said device must be suitably parameterized.

The replacement device is often not completely identical in design to the original device but of another type or from a different manufacturer. The parameters assigned to the original device cannot, therefore, simply be loaded into the replacement device. The old device parameters must therefore be transformed into new parameters for the replacement device by means of, for example, an engineering tool. That requires the old device parameters still to be accessible at the time the devices are changed over.

One possibility for acquiring the field device parameters is to use special software, tailored to the respective field device, for reading out the parameters. It may, though, no longer be possible to read out the parameters when a device is defective.

The device parameters can alternatively be stored on a central data server in order also to make the parameters accessible outside the device's own hardware. The centrally stored parameter assignment will not, though, necessarily tally with the parameter assignment stored on the field device. On-site changes are often made to a field device's settings by, for example, a service technician while it is operating. Said changes are difficult to detect locally and will then have to be reloaded back to the stored parameter assignment via other, additional communication paths.

What also correspond to the prior art are standardized device description languages that for a device class define which cross-vendor parameters describe a device. An example of this is the Electronic Device Description Language (EDDL). Said device description languages are, though, often supplemented by vendor-specific parameters for optimizations, for example, that cannot be transferred to another vendor when devices are changed over. Devices that implement the cross-vendor standard or an unsuitable version number cannot be registered.

A further approach, known from the prior art, to resolving the problem is to store the parameters on a replaceable storage medium, for example an MMC. When the device is changed over, only the storage medium will then have to be inserted into the new module to make the parameters available again. That requires the replacement device to be identical in design and likewise to have an apparatus for reading out the storage medium. That and all other previously cited methods known from the prior art generally necessitate storing the device parameters on a medium. The medium has to be read-accessed for transferring the device parameters to a replacement device, with its being necessary to use the same standard during reading and writing of the data. If the original device and field device are from different vendors, a cross-vendor standard will be necessary for this.

SUMMARY OF INVENTION

An object of the invention is to facilitate the assigning of parameters to field devices used in automation systems.

Said object is achieved by means of an apparatus for identifying parameters of at least one field device used in automation technology, having
    a monitoring unit for monitoring the field device behavior and recording operating information describing the field device behavior,
    a first memory area for storing the operating information,
    a second memory area for storing a vendor-neutral field device model, and
    a processing unit for identifying model parameters belonging to the vendor-neutral field device model based on the operating information.

Said object is further achieved by means of a method for identifying parameters of at least one field device used in automation technology, wherein
    the field device behavior is monitored and operating information describing the field device behavior is recorded,
    the operating information is stored in a first memory area,
    a vendor-neutral field device model is stored in a second memory area, and
    with the aid of a processing unit, model parameters belonging to the vendor-neutral field device model are identified based on the operating information.

In the inventive method, the field device's operational behavior is registered in the automated process in progress and logged. The operating information is, for example, the field device's input and output signals that are registered as part of a monitoring process. It is not device-specific data that has to be entered into the field device for assigning parameters thereto.

The operating information is stored in the inventive apparatus's first memory area and can be, for example, continuously updated there during ongoing operation. Through being stored on a storage medium the operating information will be available also when a field device is not active, in particular also when a field device is defective. It will thus no longer be necessary to explicitly store the vendor-specific device parameters in order to render the field device's settings reconstitutable.

The operating information is to be understood as basically all the system's available data such as, for instance, the entire bus traffic. It is not defined in advance which values are measured and recorded. The model parameters or operational characteristics can be determined ad hoc from the collected data pool.

Through the device information's being stored in the first memory area it is possible also to reconstitute historic parameter assignments to the field device.

The vendor-neutral field device model is stored in the second memory area. The operational behavior of different field devices of a specific type can be simulated by means of the field device model through assigning its associated model parameters. Examples of a device type are in this connection a PI controller with its associated controller parameters such as gain and time constant, and a digital filter with its coefficients defining the filter characteristic.

The processing unit has access to both memory areas. With the aid of the field device's operating information stored in the first memory area it is able to determine the model parameters of the vendor-neutral field device model. What is thus available as a result is a vendor-neutral field device model to which parameters have been assigned and whose process behavior corresponds to that of the field device being used.

Alongside the controller parameters already mentioned, examples of identifiable parameters are operating conditions (temperature range, for instance), thresholds, characteristic curves, planning data such as bus addresses, and plant references.

The model parameters or, as the case may be, operational characteristics and system parameters determined by the inventive apparatus permit a vendor-neutral description of the operational behavior of a field device type, with said field device type having been defined by the device model.

Because the operating information serving as a basis for identifying the model parameters is stored in the first memory area, it will be available for identifying the model parameters also if the field device has failed.

If the field device fails, a replacement device can very quickly be installed and assigned parameters in accordance with the process requirements of the automation process when the model parameters identified for the field device by the processing unit are provided as a basis for generating vendor-specific device parameters for a further field device, in particular one that is not identical in design. Parameter optimizing that has been performed during the ongoing process will therein also be transferred. The assigning of parameters to the new device can, for example, continue being varied manually until the parameter identifier signals that the behavior of the new device matches that of the old device. The process can then continue being optimally run.

The model parameters serve as a very good basis for, in the context of the automation process, suitably assigning parameters to a replacement device that may be from a vendor other than that of the original field device. The vendor-specific data employed for assigning parameters to the original field device is of use only when parameters are assigned to a replacement device that is exactly identical in design. Conversely, when, for example, devices are being changed over, an assigning to the new field device of vendor-specific parameters can be simulated manually or automatically from the model parameters without the need for a special engineering tool tailored to the old field device.

An automatic assigning of parameters to a replacement field device is advantageously enabled through the apparatus's having a further processing unit provided for generating the vendor-specific device parameters on the basis of target values for the model parameters. For example a vendor-specific target compiler for assigning parameters can be used for the further field device serving in particular as a replacement field device. The vendor-specific parameters can alternatively be manually or automatically systematically varied with the aim of simulating the field device's operational behavior described by the vendor-neutral model parameters. An example thereof is approximating the replacement field device's operational behavior to a transfer function defined by the field device model and its model parameters. Said systematic parameter varying could take place either online or offline.

In the case of online parameter assigning a field device behavior, monitored by the monitoring unit, of the new field device can be used via a feedback loop as a basis for identifying corresponding model parameters. In an advantageous embodiment of the invention the further processing unit has for this purpose a controller that determines the vendor-specific device parameters of the further field device from a deviation from model parameters determined for the further field device with the aid of the apparatus and from the target values for the model parameters. The model parameters of the further field device or, as the case may be, replacement field device are compared with the model parameters of the original field device and a deviation in said actual and target values is corrected via a control loop.

The apparatus is advantageously embodied such that identifying of the model parameters can be performed both while the field device is operating and while it is not. It must for this purpose only be insured that the processing unit has access to the first and the second memory area irrespective of the field device's status and can perform identifying of the model parameters irrespective of the field device's status. It is insured in this inventive embodiment that the data needed for assigning parameters to a replacement device will also be available after the field device has reached the end of its life.

A simple method for furnishing the operating information needed for parameter identification can be realized by the monitoring unit's being provided for recording signals sent and/or received over external interfaces of the field device. Said signals are as a rule telegrams in a network such as, for example, a LAN or field bus.

The second storage unit is advantageously provided for storing the vendor-neutral field device model in a standardized description language. An example thereof is what is termed the HART protocol as well as the RIO, leveling devices, and metering devices profiles.

BRIEF DESCRIPTION OF THE DRAWINGS

The invention is described and explained in more detail below with reference to the exemplary embodiments shown in the figures.

DETAILED DESCRIPTION OF INVENTION

Figure 1:
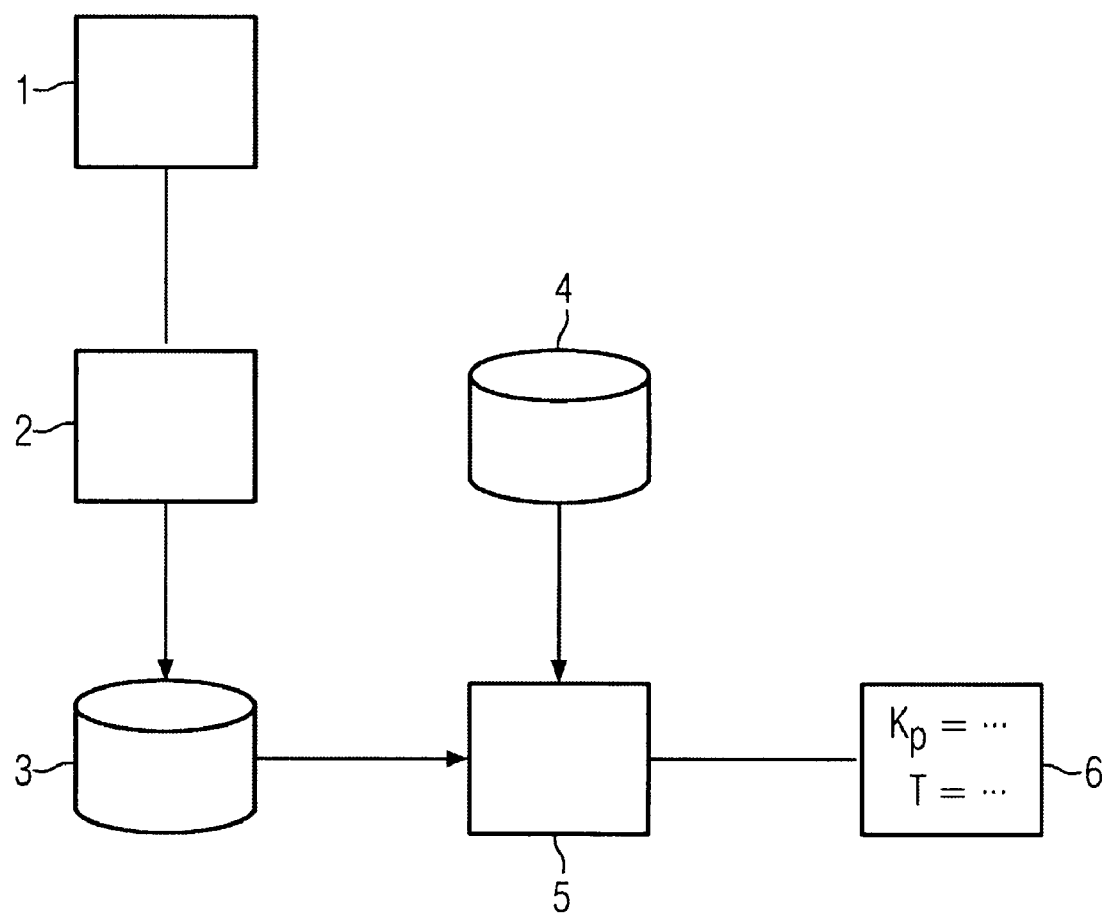
FIG. 1 is a schematic of an apparatus for identifying parameters.

FIG. 1 is a schematic of a device 13 for identifying parameters. A field device 1 incorporated into an automation process is connected to a monitoring unit 2. Said field device has been calibrated with a vendor-specific parameter set in keeping with the process requirements.

The monitoring unit 2 is embodied as what is termed an autonomic manager that checks the field device's behavior during ongoing operation. For this purpose the autonomic manager 2 measures the signals being applied to the external interfaces of the field device 1 and records them. The signals are, for example, telegrams sent over a network such as, for instance, a WLAN or field bus, or are, for example, sensor values. The recorded signals are stored in a first memory area 3.

Stored in a second memory area 4 is a field device model that describes the operational behavior of the field device 1 in a cross-vendor manner. Different field devices of the same type (PID controllers, for example) can be described by means of the field device model. The field device model has model parameters 6 that determine the field device model's system behavior.

A processing unit 5 has access to the operating information, stored in the first memory area, that describes the operational behavior of the real field device 2, and to the field device model stored in the second memory area 4. Based on the operating information of the real field device 1, the processing unit 5 determines the field device model's model parameters 6 in such a way that the vendor-neutral field device model to which parameters are assigned will exhibit the same system behavior as the real field device 1. The identified model parameters are, for example:

Vendor specifications, such as device type, that can be read from, for example, an electronic type plate
Operating conditions, such as temperature range
Controller parameters
Registering rate
Scaling factors for temperature, pressure . . . (additional information is required for this concerning the automation system in which the field device is being used)
Monitoring, thresholds
Characteristic curves The vendor-neutral model parameters can be used in the following as a basis for assigning parameters to further field devices which, in particular, may also be from another vendor. That can be advantageous if, for example, the field device fails and has to be replaced by a replacement field device and the replacement field device is not identical in design to the original field device.

What is special about the parameter identification is that the model parameters are determined from the field device's runtime characteristics and no accessing of engineering information is necessary. No parameters have to be read either from the device of from any other storage media. The processing unit does not require a direct coupling to the autonomic manager 2 but uses only the operating information stored in the first memory area 3, which information can also be designated as a history. Parameter identifying can therefore also work offline on a copy of the history. In the first memory area 3 is a mechanism that can analyze standardized telegrams and data in order to read out a drive's target/actual value from, for example, a Profibus telegram.

Figure 2:
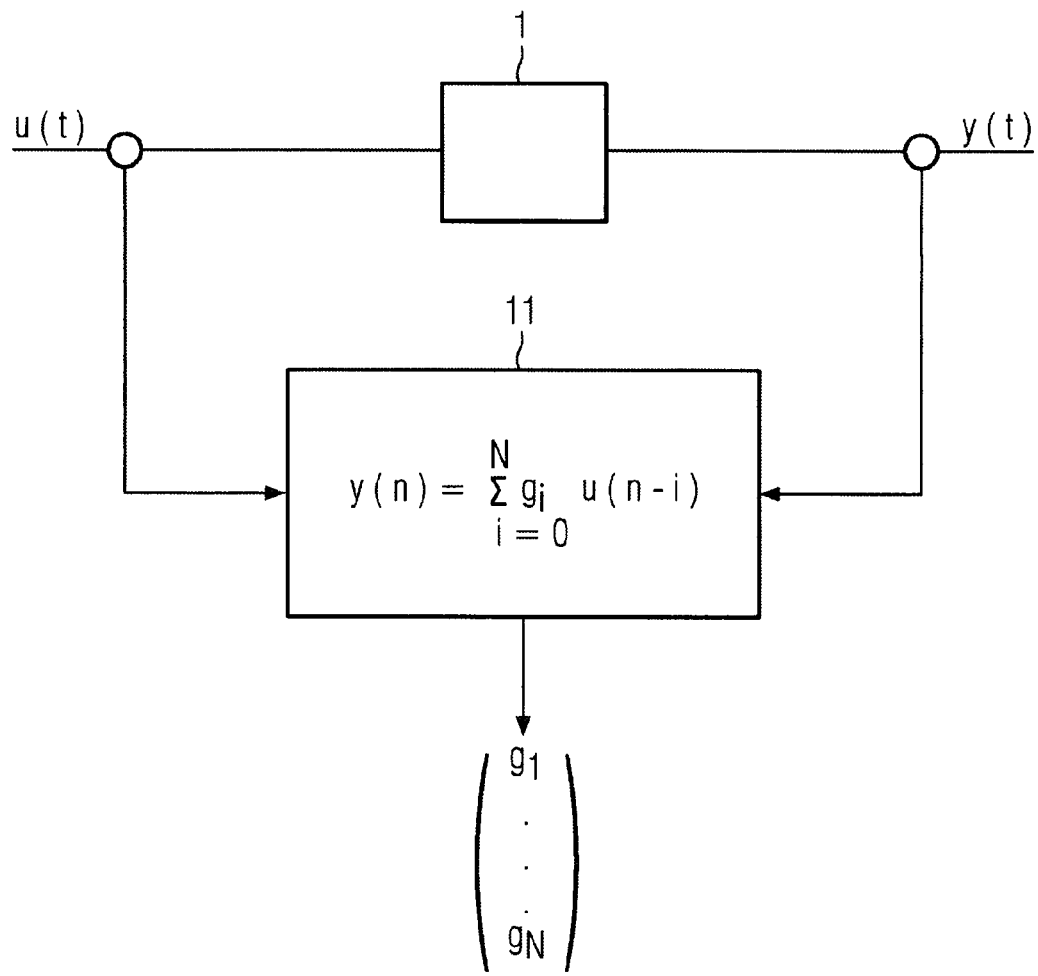
FIG. 2 shows an exemplary realization of a method for identifying parameters.

FIG. 2 shows an exemplary realization of a method for identifying parameters. The example uses what is termed an FIR (Finite Impulse Response) filter 11 for identifying model parameters describing the operational behavior of a field device 1. The time-dependent input signals u(t) and the output signals y(t) of the field device 1 are evaluated by the FIR filter 11 at discrete sampling instants n. The FIR filter 11 is characterized by an equation linking the output signals y(n) to the input signals of the last N sampled values u(n−N) . . . u(n) via the filter coefficients $g_i$. Equations with the aid of which the filter coefficients $g_0 \ldots g_N$ can be determined will accordingly be available after N sampling instants. The filter coefficients $g_0 \ldots g_N$ correspond to the vendor-neutral model parameters by means of which the field device behavior can be described. Based on the filter coefficients, new vendor-specific device parameters for a further field device from another vendor can be determined in an ensuing step of the method.

Figure 3:
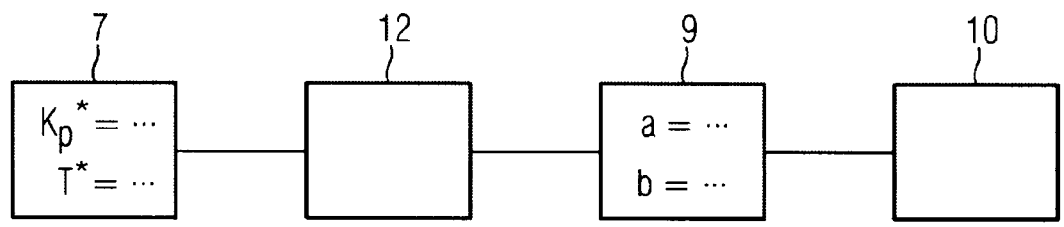
FIG. 3 is a schematic of a method for generating vendor-specific device parameters on the basis of target values for model parameters.

FIG. 3 is a schematic of a method for generating vendor-specific device parameters 9 on the basis of target values 7 for model parameters. The target values 7 of the model parameters can be determined for the field device 1 for example at a previous step of the method with the aid of the FIR filter 11 shown in FIG. 2. Let it be assumed below that the field device 1 must, owing to a technical defect, be replaced by a further field device 10 that is not identical in design, referred to below also as a replacement device. To insure the same operational behavior from the replacement device 10 within an automation process, the model parameters 6 previously determined for the original field device are defined as the target values 7 for the replacement field device 10.

The vendor-specific device parameters 9 of the replacement field device 10 are determined from the target values 7 of the model parameters with the aid of a vendor-specific target compiler 12.

A cross-vendor method for assigning parameters that is known from DE 101 32 036 C2 can alternatively also be used for generating the vendor-specific device parameters 9 from the target values 7 of the model parameters. A further possibility is to systematically vary the vendor-specific device parameters with the aim, for example, of simulating a desired transfer function.

Figure 4:
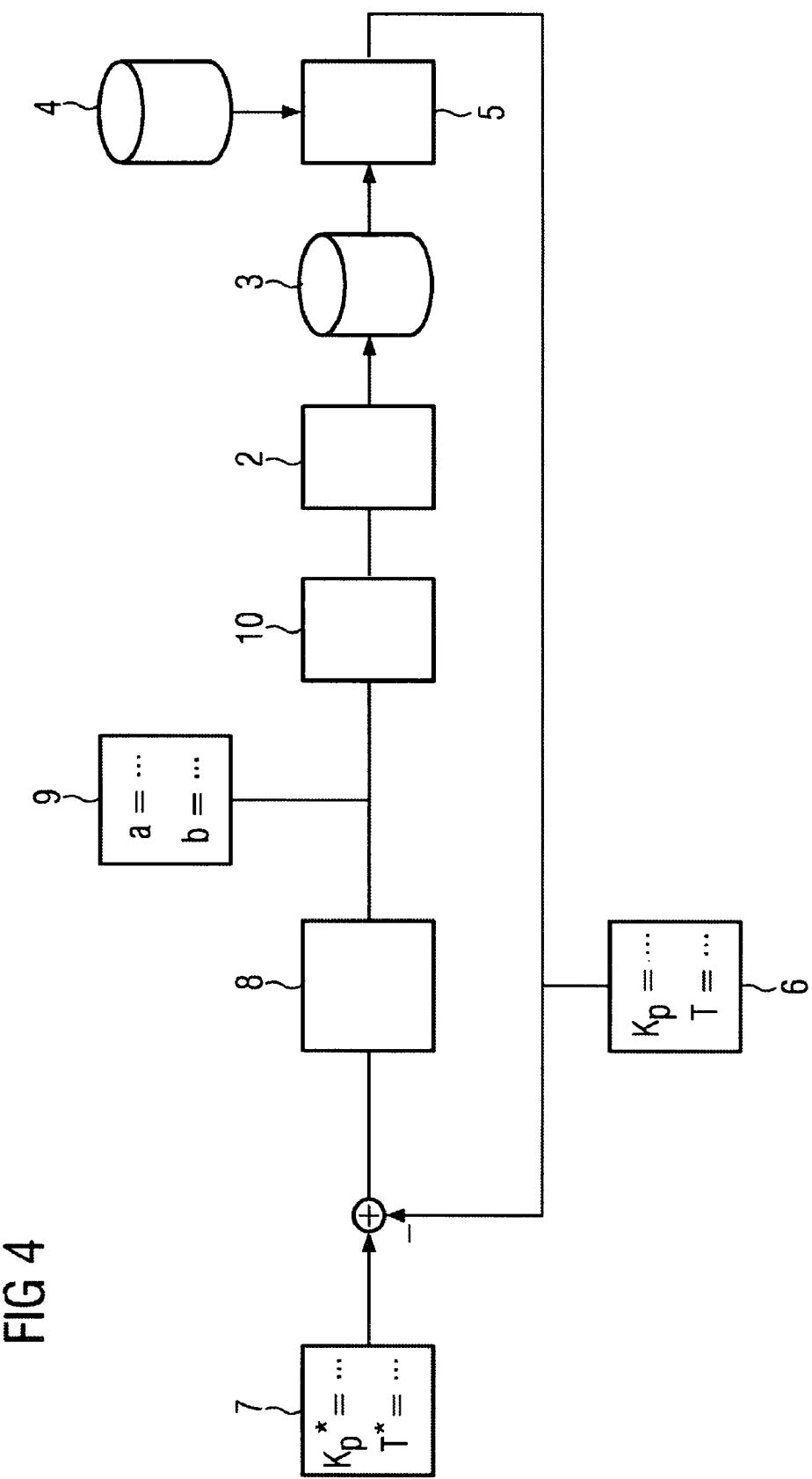
FIG. 4 is a schematic of a further method for generating vendor-specific device parameters on the basis of target values for model parameters.

FIG. 4 is a schematic of a further method for generating vendor-specific device parameters 9 on the basis of target values 7 for model parameters for a further field device 10 serving in particular as a replacement device for an original field device. The target values 7 have been determined according to, for example, the method, described in FIG. 2, for the original field device. The idea underlying the method shown for identifying the suitable device-specific parameters 9 is based on a closed control loop.

Parameters are assigned to the replacement field device 10 using vendor-specific device parameters 9. The replacement field device 10 is coupled to a monitoring unit 2 that monitors the field device behavior of the replacement field device 10 and stores relevant operating information in a first memory area 3. For monitoring the field device behavior the monitoring unit 2 taps the signals being applied to the external interfaces of the replacement field device 10.

Stored in a second memory area 4 is a vendor-neutral field device model corresponding to the common type of the field device and replacement field device 10. Current model parameters 6 of the replacement field device 10 are determined from the replacement field device's operating information and from the vendor-neutral field device model with the aid of a processing unit 5.

The current model parameters 6 are fed back and compared with the target values 7 of the model parameters. The system deviation resulting from the difference between the target values 7 and the current model parameters 6 is lastly sent to a further processing unit 8 embodied as a controller, for example. The corrected vendor-specific device parameters 9 of the replacement field device 10 will finally be available at the controller's output.

With the method described in FIG. 4 an inventive embodiment for identifying parameters is thus used not only for determining the original field device's model parameters but also for automatically assigning parameters to the replacement field device.

The inventive method or, as the case may be, inventive apparatus can further be used for applications other than changing over devices. Examples include:

Determining a relationship/correlation between vendor-specific field device parameters and values observed at the external interfaces, with the aim of achieving automated setting of a standardized behavior for all field devices of one type regardless of the respective vendor or version status of a vendor's field device type.

Simulating a field device behavior in the case, for example, of process simulating during a planning phase or as part of a virtual system power-on.

Monitoring a plurality of devices of the same kind. The inventive apparatus can herein compare a plurality of field devices of the same kind and transfer the parameters of the best device to the other devices.

Additionally registering the operational characteristics for statistics and verifications.

Comparing devices.

Obtaining optimized parameters.

The invention claimed is:

1. An apparatus for identifying parameters of at least one field device used in automation technology, comprising:
   a monitoring unit for monitoring the field device behavior and recording operating information describing the field device behavior;
   a first memory area for storing the operating information;
   a second memory area for storing a field device model simulating the operational behavior of the field device; and
   a processing unit for identifying model parameters belonging to the field device model based on the operating information so that the field device model to which parameters are assigned will exhibit similar system behavior as the field device,
   wherein the field device model is a vendor-neutral field device model,
   wherein the apparatus has a further processing unit to provide vendor-specific device parameters for the model parameters based upon target values, and
   wherein the further processing unit has a controller that determines the vendor-specific device parameters of a further field device based upon deviation from the model parameters determined for the further field device and target values for the model parameters.

2. The apparatus as claimed in claim 1, wherein the similar system behavior of the field device model is the same system behavior as the field device.

3. The apparatus as claimed in claim 1, wherein the model parameters identified for the field device by the processing unit are provided as a basis for generating vendor-specific device parameters for a further field device.

4. The apparatus as claimed in claim 3, wherein the further field device is different in design compared to the field device.

5. The apparatus as claimed in claim 1, wherein the monitoring unit is provided for recording signals sent or received via external interfaces of the field device.

6. The apparatus as claimed in claim 1, wherein the monitoring unit is provided for recording signals sent and received via external interfaces of the field device.

7. The apparatus as claimed in claim 1, wherein the second storage unit is storing the vendor-neutral field device model in a standardized description language.

8. A method for identifying parameters of at least one field device used in automation technology, comprising:
   monitoring the behavior of the field device;
   recording operating information describing the behavior of the field device during operation;
   storing the operating information in a first memory area;
   storing a field device model simulating the operational behavior of the automation field device in a second memory area; and
   identifying model parameters belonging to the field device model based upon the operating information so that the field device model will exhibit similar system behavior as the field device,
   wherein the model parameters identified for the field device are used as a basis for generating vendor-specific device parameters for a further field device, and
   wherein the vendor-specific device parameters of the further field device are determined from a deviation from model parameters determined for the further field device and from the target values for the model parameters.

9. The method as claimed in claim 8, wherein the field device model is a vendor-neutral field device model.

10. The method as claimed in claim 8, wherein the field device and the further automation field device are different in design.

11. The method as claimed in claim 10, wherein the vendor-specific device parameters are generated by a further processing unit based upon target values used for the model parameters.

12. The method as claimed in claim 8, wherein the identifying of the model parameters is performed while the field device is operating.

13. The method as claimed in claim 8, wherein the identifying of the model parameters is performed while the field device is not operating.

14. The method as claimed in claim 8, wherein signals sent or received via external interfaces of the field device are recorded.

15. The method as claimed in claim 8, wherein the field device model is stored in a standardized description language.

* * * * *